(12) United States Patent
O'Garro

(10) Patent No.: US 6,857,876 B1
(45) Date of Patent: Feb. 22, 2005

(54) MATH GAME AND METHOD

(76) Inventor: Wayne J. O'Garro, 100 Dix St., Dorchester, MA (US) 02122

( * ) Notice: Subject to any disclaimer, the term of this patent is extended or adjusted under 35 U.S.C. 154(b) by 40 days.

(21) Appl. No.: 10/754,328

(22) Filed: Jan. 12, 2004

(51) Int. Cl.$^7$ .......................... G09B 19/22; G09B 1/00; A63F 9/14

(52) U.S. Cl. ...................... 434/128; 434/188; 434/191; 434/200; 434/209; 273/246

(58) Field of Search ............................... 434/128, 188, 434/200, 191, 209; 273/246

(56) References Cited

U.S. PATENT DOCUMENTS

| | | | |
|---|---|---|---|
| 1,493,738 A | * 5/1924 | Cowan | 273/246 |
| 2,871,561 A | 2/1959 | Guzak | |
| 2,901,839 A | * 9/1959 | Huff | 434/207 |
| 3,417,995 A | * 12/1968 | Creely | 273/237 |
| 3,690,666 A | * 9/1972 | Seitz | 273/246 |
| 4,360,347 A | 11/1982 | Ghaznavi | |
| 4,711,453 A | 12/1987 | Saint Ive | |
| D354,091 S | 1/1995 | Constance | |
| D381,047 S | 7/1997 | Gessner | |
| 5,649,704 A | 7/1997 | Dobbin | |
| 5,772,209 A | 6/1998 | Thompson | |
| 5,853,173 A | * 12/1998 | Murphy | 273/246 |

* cited by examiner

Primary Examiner—Derris H. Banks
Assistant Examiner—Dmitry Suhol

(57) ABSTRACT

A math game and method includes a game board having a plurality of elongated slots therein. Each of the slots defines a row arranged in a plurality of columns. The columns each have a number of rows therein equal to a number of columns provided. A plurality of different multiplier indicia is positioned on the game board and positioned adjacent to one of the columns. A plurality of multiplicand indicia is positioned on the game board and positioned adjacent to one of the left ends of the rows. The columns each include multiplicand indicia beginning with a numeral 1 and progressing by one for each subsequent row. Each of a plurality of game pieces is mounted in one of the slots and is selectively positioned along a length thereof. A random number indicator indicates a number between 1 and a number equal to the number of the columns.

6 Claims, 3 Drawing Sheets

MATH GAME AND METHOD

BACKGROUND OF THE INVENTION

1. Field of the Invention

The present invention relates to educational game devices and more particularly pertains to a new educational game device for teaching players of the game to learn multiplication tables.

2. Description of the Prior Art

The use of educational game devices is known in the prior art. While these devices fulfill their respective, particular objectives and requirements, the need remains for a game that provides a high level of entertainment and a competitive format for teaching players of the game multiplication tables.

SUMMARY OF THE INVENTION

The present invention meets the needs presented above by generally comprising a game board that has a top surface and a peripheral edge. The top surface has a plurality of elongated slots therein. Each of the slots defines a row that is positioned in one of a plurality of columns. Each of the columns has plurality of rows therein and each of the rows has a left end and a right end. The columns each have a number of rows therein equal to a number of columns provided. A plurality of multiplier indicia is positioned on the game board. Each of the multiplier indicia is positioned adjacent to one of the columns. Each of the multiplier indicia is a different numeral beginning with 1 and increasing to a number equal to the number of columns. A plurality of multiplicand indicia is positioned on the game board. Each of the multiplicand indicia is positioned adjacent to one of the left ends of the rows such that each of the rows has an adjacent one of the multiplicand indicia. The columns each include multiplicand indicia beginning with a numeral 1 positioned adjacent to an uppermost row of the column and increasing by one for each subsequent row to a lowermost row of the column. Each of a plurality of game pieces is mounted in one of the slots. The game pieces are selectively positioned adjacent to the right or left ends of the rows. A random number indicator indicates a number between 1 and a number equal to the number of the columns.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
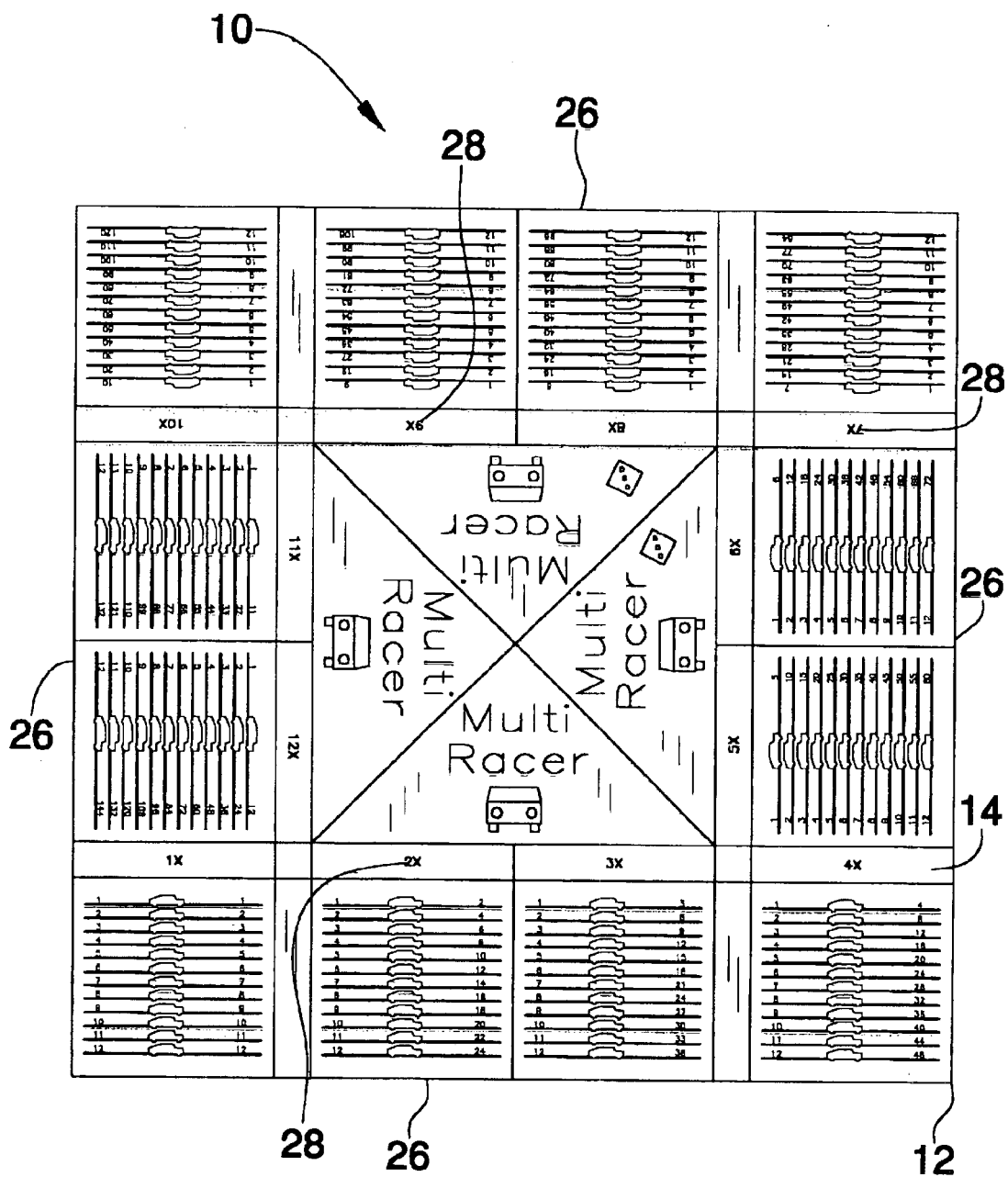
FIG. 1 is a schematic top view of a math game and method according to the present invention.
Figure 2:
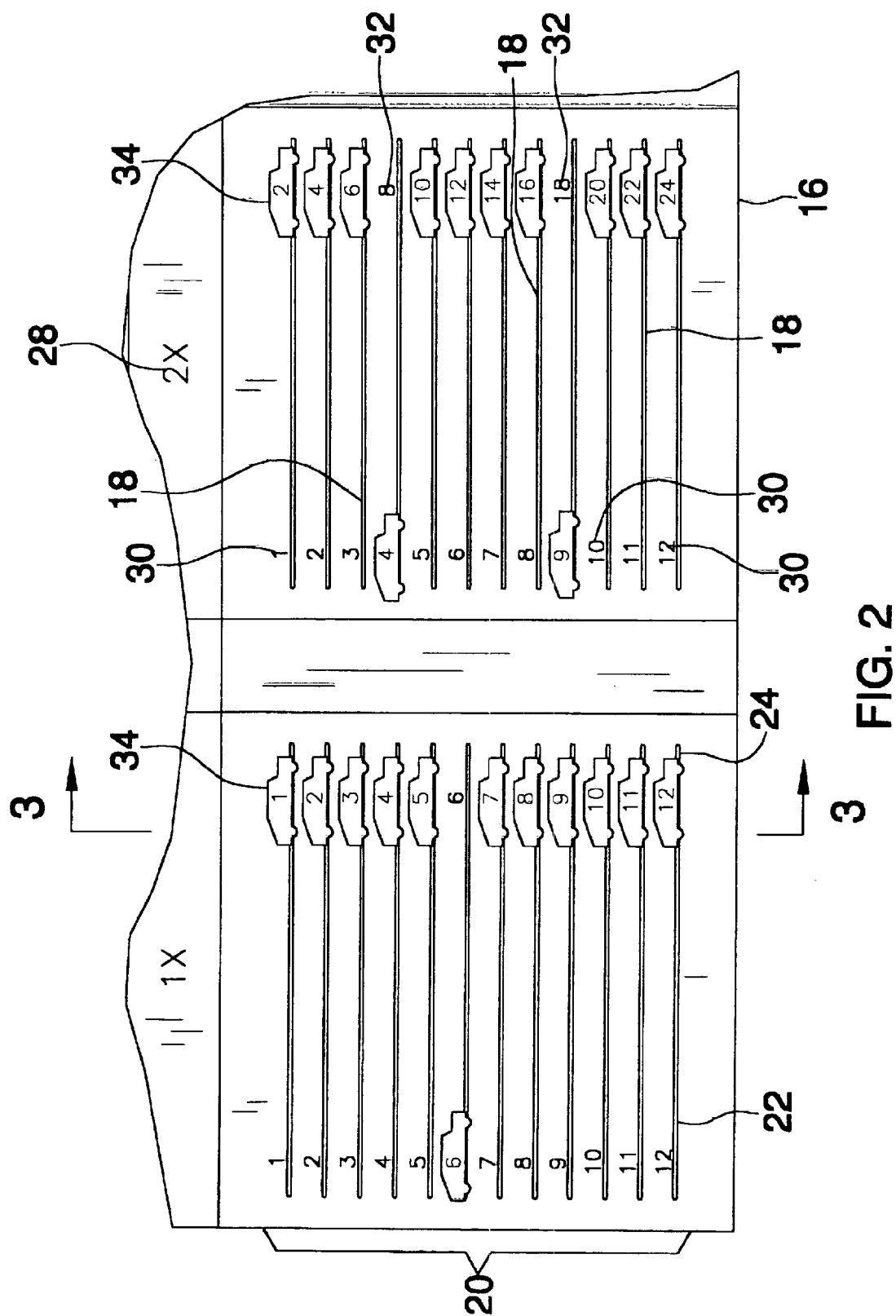
FIG. 2 is a schematic top enlarged view of the present invention.
Figure 3:
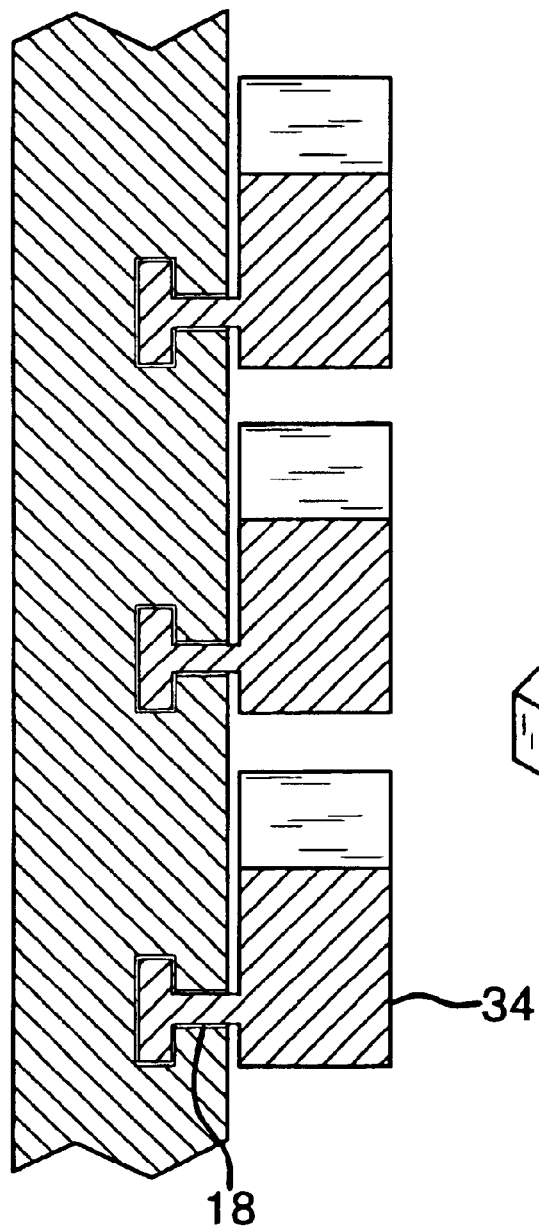
FIG. 3 is a schematic cross-sectional view taken along line 3—3 of FIG. 2 of the present invention.
Figure 5:
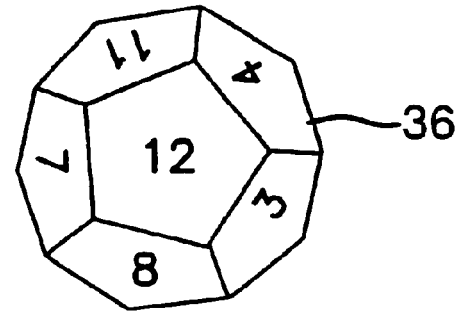
FIG. 5 is a schematic perspective view of a die of the present invention.
Figure 4:
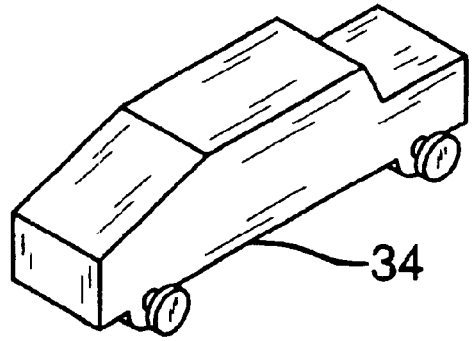
FIG. 4 is a schematic perspective back view of a game piece of the present invention.

With reference now to the drawings, and in particular to FIGS. 1 through 5 thereof, a new educational game device embodying the principles and concepts of the present invention and generally designated by the reference numeral 10 will be described.

As best illustrated in FIGS. 1 through 5, the math game and method 10 generally comprises a game board 12 having a top surface 14 and a peripheral edge 16. The top surface 14 has a plurality of elongated slots 18 therein. Each of the slots 18 defines a row that is positioned in one of a plurality of columns 20 such that each of the columns 20 has plurality of rows, or slots 18. The rows 18 each have a left end 22 and a right end 24. Each of the columns 20 has a number of rows 18 therein equal to a number of columns 20 provided. The peripheral edge 16 has four sides edges 26 such that the game board 12 has a generally rectangular shape. Each of the columns 20 is positioned adjacent to one of the side edges 26 of that game board 12 such that the rows 18 of an adjacent column 20 are aligned substantially parallel with the adjacent one of the side edges. The side edges 26 each have at least one column 20 positioned adjacent thereto. The plurality of columns 20 is preferably twelve columns.

A plurality of multiplier indicia 28 is positioned on the game board 12. Each of the multiplier indicia 28 is positioned adjacent to one of the columns 20. The multiplier indicia 28 each has a different numeral beginning with 1 and increasing to a number equal to the number of columns 20, therefore the plurality of multiplier indicia 28 preferably includes the numerals 1 through 12.

A plurality of multiplicand indicia 30 is positioned on the game board 12. Each of the multiplicand indicia 30 is positioned adjacent to one of the left ends 22 of the rows 18 such that each of the rows 18 has an adjacent one of the multiplicand indicia 30. Each of the columns 20 includes multiplicand indicia 30 beginning with a numeral 1 positioned adjacent to an uppermost row of the column 20 and increasing by one for each subsequent row to a lowermost row of the column.

Preferably, a plurality of product indicia 32 is positioned on the game board 12. Each of the product indicia 32 is positioned adjacent to one of the right ends 24 of the rows 18 such that each of the rows 18 has an adjacent one of the product indicia 32. The product indicia 32 are each equal to the multiplier indicia 28 of an associated column multiplied by the multiplicand indicia 30 of an associated row 18.

Each of a plurality of game pieces 34 is mounted in one of the slots 18. The game pieces 34 are each selectively positioned adjacent to the right 24 or left 22 ends of the rows 18. The game pieces 34 each preferably resemble an automobile and may be transparent.

A random number indicator 36 is provided for indicating a number between 1 and a number equal to the number of the columns 20. The number indicator 36 may include an electronic random number generator, a spin wheel or other number indicator. However, it is preferred that the number indicator comprises a 12 sided die.

Rules of the Game

The game may be played by as many players as there are columns 20. The players begin by using the number indicator 36 to find out who begins. The player obtaining the highest number goes first and then play continues clockwise around the game board 12 once each player has a column 20. The players use the means in turn until a unique number is indicated for each player. The player is assigned a column 20 that has the multiplier 28 equal to the unique number.

Once all of the players have a column 20, each player uses the random number indicator 36 once in turn. The player then moves the game piece 34 in their column 20 from the left side 22 to the right side 24 when the number indicator 36 indicates a number equal to an associated one of the multiplicand indicia 30. By moving the game piece 34 from the multiplicand 30 to the product 32, the player learns multiplication skills. Alternatively, the game may be played without the product indicia 32. In that case, the player may only move the game piece 34 to the right if they correctly provide the product of the associated multiplicand 30 and the multiplier 28 of the player's column 20.

If a player rolls a number which has already been rolled, that player looses their turn and the next player uses the number indicator 36. The player who first moves all of the game pieces 34 of their column 20 from the left side 22 to the right side 24 wins the game. Alternatively, a finite number of turns may be provided during which the players attempt to move as many game pieces 34 to the right as possible.

Additional rules may include a wild roll wherein a player receiving a number 6 by the random number indicator 36 is allowed to roll again. This allows a person to play the number 6 row and if that row is already filled, the player is allowed to roll again. Also, once a winner has been determined, the remaining players may continue to play until second place, third place and so forth are determined.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of playing an educational game by a plurality of players comprising the steps of:

providing a game board having a top surface and a peripheral edge, said top surface having a plurality of elongated slots therein, each of said slots defining a row being positioned in one of a plurality of columns such that each of said columns has plurality of rows therein each having a left end and a right end, each of said columns having a number of rows therein equal to a number of columns provided;

providing a plurality of multiplier indicia, each of said multiplier indicia being positioned adjacent to one of said columns, each of said multiplier indicia being a different numeral beginning with 1 and increasing to a number equal to the number of columns;

providing a plurality of multiplicand indicia, each of said multiplicand indicia being positioned adjacent to one of said left ends of said rows such that each of said rows has an adjacent one of said multiplicand indicia, wherein each of said columns includes multiplicand indicia beginning with a numeral 1 positioned adjacent to an uppermost row of said column and increasing by one for each subsequent row to a lowermost row of said column;

providing a plurality of game pieces, each of said game pieces being mounted in one of said slots, each of said game pieces being selectively positioned adjacent to said right or left ends of said rows;

providing a random number indicator for indicating a number between 1 and a number equal to the number of said columns;

each of said players using said number indicator in turn until a unique number is indicated for each player, said player being assigned a column having the multiplier equal to said unique number;

using said random number indicator once by each player in turn and moving said game piece in a player's column from said left side to said right side when said number indicator indicates a number equal to an associated one of said multiplicand indicia;

winning the game by a player having all of said game pieces moved to respective right ends within the player's column.

2. A method of playing an educational game by a plurality of players comprising the steps of:

providing a game board having a top surface and a peripheral edge, said top surface having a plurality of elongated slots therein, each of said slots defining a row being positioned in one of a plurality of columns such that each of said columns has plurality of rows therein each having a left end and a right end, each of said columns having a number of rows therein equal to a number of columns provided, said peripheral edge having four sides edges such that said game board has a generally rectangular shape, each of said columns being positioned adjacent to one of said side edges such that said rows of an adjacent column is aligned substantially parallel with the adjacent one of said side edges, each of said side edges having at least one column positioned adjacent thereto, said plurality of columns being twelve columns;

providing a plurality of multiplier indicia, each of said multiplier indicia being positioned adjacent to one of said columns, each of said multiplier indicia being a different numeral beginning with 1 and increasing to a number equal to the number of columns, said plurality of multiplier indicia including the numerals 1 through 12;

providing a plurality of multiplicand indicia, each of said multiplicand indicia being positioned adjacent to one of said left ends of said rows such that each of said rows has an adjacent one of said multiplicand indicia, wherein each of said columns includes multiplicand indicia beginning with a numeral 1 positioned adjacent to an uppermost row of said column and increasing by one for each subsequent row to a lowermost row of said column;

a providing a plurality of product indicia, each of said product indicia being positioned adjacent to one of said right ends of said rows such that each of said rows has an adjacent one of said product indicia, each of said product indicia being equal to the multiplier indicia of an associated column multiplied by the multiplicand indicia of an associated row;

providing a plurality of game pieces, each of said game pieces being mounted in one of said slots, each of said game pieces being selectively positioned adjacent to said right or left ends of said rows;

providing a random number indicator for indicating a number between 1 and a number equal to the number of said columns, said number indicator comprising a 12 sided die;

each of said players using said number indicator in turn until a unique number is indicated for each player, said player being assigned a column having the multiplier equal to said unique number;

using said random number indicator once by each player in turn and moving said game piece in a player's column from said left side to said right side when said number indicator indicates a number equal to an associated one of said multiplicand indicia;

winning the game by a player having all of said game pieces moved to respective right ends within the player's column.

3. An educational game assembly including:

a game board having a top surface and a peripheral edge, said top surface having a plurality of elongated slots therein, each of said slots defining a row being positioned in one of a plurality of columns such that each of said columns has plurality of rows therein each having a left end and a right end, each of said columns having a number of rows therein equal to a number of columns provided;

a plurality of multiplier indicia, each of said multiplier indicia being positioned adjacent to one of said columns, each of said multiplier indicia being a different numeral beginning with 1 and increasing to a number equal to the number of columns;

a plurality of multiplicand indicia, each of said multiplicand indicia being positioned adjacent to one of said left ends of said rows such that each of said rows has an adjacent one of said multiplicand indicia, wherein each of said columns includes multiplicand indicia beginning with a numeral 1 positioned adjacent to an uppermost row of said column and increasing by one for each subsequent row to a lowermost row of said column;

a plurality of game pieces, each of said game pieces being mounted in one of said slots, each of said game pieces being selectively positioned adjacent to said right or left ends of said rows;

a random number indicator for indicating a number between 1 and a number equal to the number of said columns;

a plurality of product indicia, each of said product indicia being positioned adjacent to one of the said right ends of said rows such that each of said rows has an adjacent one of said product indicia, each of said product indicia being equal to the multiplier indicia of an associated column multiplied by the multiplicand indicia of an associated row.

4. The assembly according to claim 3, wherein said peripheral edge has four sides edges such that said game board has a generally rectangular shape, each of said columns being positioned adjacent to one of said side edges such that said rows of an adjacent column is aligned substantially parallel with the adjacent one of said side edges, each of said side edges having at least one column positioned adjacent thereto.

5. The assembly according to claim 3, wherein said plurality of columns includes twelve columns.

6. The assembly according to claim 4, wherein said number indicator comprising a 12 sided die.

* * * * *